(12) United States Patent
Hanke et al.

(10) Patent No.: US 8,968,099 B1
(45) Date of Patent: Mar. 3, 2015

(54) SYSTEM AND METHOD FOR TRANSPORTING VIRTUAL OBJECTS IN A PARALLEL REALITY GAME

(71) Applicant: Google Inc., Mountain View, CA (US)

(72) Inventors: John V. Hanke, Piedmont, CA (US); Mark A. Aubin, Sunnyvale, CA (US); David Kornmann, Tucson, AZ (US); Marius Milner, Palo Alto, CA (US); Keith P. Golden, San Francisco, CA (US); Lior Stern, Belmont, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/666,045

(22) Filed: Nov. 1, 2012

(51) Int. Cl.
*A63F 9/24* (2006.01)

(52) U.S. Cl.
USPC .................................................. 463/42; 463/9

(58) Field of Classification Search
USPC ...................................... 463/31–42; 273/292
See application file for complete search history.

(56) References Cited

U.S. PATENT DOCUMENTS

| | | | |
|---|---|---|---|
| 6,530,841 B2 | 3/2003 | Bull et al. | |
| 6,811,084 B2 | 11/2004 | Tatsuta et al. | |
| 7,275,994 B2 | 10/2007 | Eck et al. | |
| 7,435,179 B1 | 10/2008 | Ford | |
| 7,491,123 B2 | 2/2009 | Smith | |
| 7,564,469 B2 | 7/2009 | Cohen | |
| 7,946,919 B2 | 5/2011 | Piccionelli | |
| 7,970,749 B2 | 6/2011 | Uhlir et al. | |
| 8,002,617 B1 | 8/2011 | Uskela et al. | |
| 8,070,608 B2 | 12/2011 | Uhlir | |
| 8,108,459 B1 | 1/2012 | Hoffman et al. | |
| 8,190,733 B1 | 5/2012 | Hoffman et al. | |
| 8,267,794 B2 | 9/2012 | Van Luchene | |
| 8,287,383 B1 | 10/2012 | Etter et al. | |
| 8,291,016 B1 | 10/2012 | Whitney et al. | |
| 8,308,568 B2 | 11/2012 | Amaitis et al. | |
| 8,366,446 B2 | 2/2013 | Kreiner et al. | |

(Continued)

FOREIGN PATENT DOCUMENTS

| | | |
|---|---|---|
| EP | 1574238 | 9/2005 |
| EP | 2101889 | 9/2009 |

(Continued)

OTHER PUBLICATIONS

Matyas, "Playful Geospatial Data Acquisition by Location-Based Gaming Communities", The International Journal of Virtual Reality, 2007, vol. 6, No. 3, pp. 1-10.

(Continued)

*Primary Examiner* — Masud Ahmed
(74) *Attorney, Agent, or Firm* — Dority & Manning, P.A.

(57) ABSTRACT

Systems and methods of transporting virtual objects through a virtual world associated with a parallel reality game are provided. The virtual world has a geography that parallels at least a portion of the geography of the real world. A method includes accessing at least one data source storing or providing data associated with the location of a real world carrier. The method further includes modifying game data associated with the parallel reality to transport at least one virtual object through the virtual world, such that the position of the virtual object in the virtual world is based, at least in part, on the data associated with the location of the real world carrier. Other implementations are directed to systems, apparatus, non-transitory computer-readable media, devices, and user interfaces for transporting virtual objects in a location-based parallel reality game.

19 Claims, 8 Drawing Sheets

(56) References Cited

U.S. PATENT DOCUMENTS

| | | |
|---|---|---|
| 8,388,451 B2 * | 3/2013 | Auterio et al. ............... 463/42 |
| 2001/0009867 A1 | 7/2001 | Sakaguchi et al. |
| 2003/0036428 A1 | 2/2003 | Aasland |
| 2003/0224855 A1 | 12/2003 | Cunningham |
| 2004/0029625 A1 | 2/2004 | Annunziata |
| 2004/0058732 A1 | 3/2004 | Piccionelli |
| 2004/0255268 A1 | 12/2004 | Meijer et al. |
| 2005/0049022 A1 | 3/2005 | Mullen |
| 2006/0105838 A1 | 5/2006 | Mullen |
| 2006/0258420 A1 | 11/2006 | Mullen |
| 2006/0284789 A1 | 12/2006 | Mullen |
| 2006/0287026 A1 | 12/2006 | Mullen |
| 2007/0021166 A1 | 1/2007 | Mattila |
| 2007/0060408 A1 | 3/2007 | Schultz et al. |
| 2007/0104348 A1 | 5/2007 | Cohen |
| 2007/0190494 A1 * | 8/2007 | Rosenberg ............... 434/11 |
| 2007/0281765 A1 | 12/2007 | Mullen |
| 2007/0281766 A1 | 12/2007 | Mullen |
| 2008/0015018 A1 | 1/2008 | Mullen |
| 2008/0015024 A1 | 1/2008 | Mullen |
| 2008/0146338 A1 | 6/2008 | Bernard et al. |
| 2009/0024986 A1 | 1/2009 | Meijer et al. |
| 2009/0281851 A1 | 11/2009 | Newton et al. |
| 2010/0287011 A1 * | 11/2010 | Muchkaev ............... 705/7 |
| 2010/0331089 A1 | 12/2010 | Priebatsch et al. |
| 2011/0004658 A1 | 1/2011 | Chesley et al. |
| 2011/0081973 A1 | 4/2011 | Hall |
| 2011/0212783 A1 * | 9/2011 | Dale et al. ............... 463/42 |
| 2011/0312423 A1 * | 12/2011 | Mosites et al. ............... 463/42 |
| 2011/0319148 A1 | 12/2011 | Kinnebrew et al. |
| 2012/0040745 A1 | 2/2012 | Auterio et al. |
| 2012/0040763 A1 * | 2/2012 | Auterio et al. ............... 463/42 |
| 2012/0062953 A1 | 3/2012 | Silverbrook et al. |
| 2012/0094770 A1 | 4/2012 | Hall |
| 2012/0157210 A1 | 6/2012 | Hall |
| 2012/0185892 A1 | 7/2012 | Camplejohn et al. |
| 2012/0226627 A1 | 9/2012 | Yang |
| 2012/0231887 A1 | 9/2012 | Lee et al. |
| 2012/0233258 A1 | 9/2012 | Vijayaraghavan et al. |
| 2012/0246104 A1 | 9/2012 | Di Sciullo et al. |
| 2012/0315992 A1 | 12/2012 | Gerson et al. |
| 2013/0004932 A1 | 1/2013 | Mahajan et al. |
| 2013/0072308 A1 | 3/2013 | Peck et al. |
| 2013/0117326 A1 | 5/2013 | De Smet et al. |
| 2013/0178257 A1 | 7/2013 | Langseth |

FOREIGN PATENT DOCUMENTS

| | | |
|---|---|---|
| EP | 2393056 | 12/2011 |
| EP | 2416289 | 2/2012 |
| WO | WO 02/062436 | 8/2002 |

OTHER PUBLICATIONS http://klout.com/corp/klout_score—4 pages, Nov. 2011.
www.empireavenue.com/about/—1 page, Nov. 2011.

* cited by examiner

SYSTEM AND METHOD FOR TRANSPORTING VIRTUAL OBJECTS IN A PARALLEL REALITY GAME

FIELD

The present disclosure relates generally to location-based gaming, and more particularly, to a system and method for transporting virtual objects in a location-based parallel reality game.

BACKGROUND

Computer-based and/or electronic gaming systems are known that provide a shared virtual environment for many players to interact in a virtual world. With increased availability and connectivity to the Internet, many players from all over the world can interact in the virtual environment and perform various game objectives. Such gaming systems typically do not have a virtual world geography that parallels the real world.

Location-based games use the real world as their geography. Some location-based games add virtual locations on a map that parallels the real world geography. Such games, however, are typically focused on real world objectives. These games typically do not include a virtual world that parallels the real world and that acts as a virtual game environment in which many players can interact and perform various game objectives in the parallel virtual world by navigating and performing actions in the real world.

A parallel reality game providing a shared virtual world that parallels at least a portion of the real world can host a variety of interactions that can attract a community of players. Providing a virtual world with a geography that parallels at least a portion of the real world allows players to navigate the virtual world by navigating the real world. A parallel reality game can also provide virtual objects which exist within the virtual world. In certain games it can be desirable for one player to transfer a virtual object to another player.

However, to exchange virtual objects from one player to another, parallel reality games can require that both players simultaneously navigate the real world such that they are able to meet and interact in the virtual world. This requirement can be cumbersome, especially if the players are located a large distance from one another or if the players' schedules do not allow for a convenient meeting time and location. Virtual objects can also be transferred from one player to another instantaneously, without significant real world or virtual action. However, the transfer of virtual objects in this manner can feel unrealistic and can diminish the feeling that virtual objects are hidden parts of the real world.

SUMMARY

Aspects and advantages of the invention will be set forth in part in the following description, or may be obvious from the description, or may be learned through practice of the invention.

One exemplary aspect is directed to a computer-implemented method of transporting virtual objects in a virtual world associated with a parallel reality game. The virtual world has a geography that parallels at least a portion of the geography of the real world. The method includes accessing at least one data source storing or providing data associated with the location of a real world carrier. The method further includes modifying game data associated with the parallel reality game to transport at least one virtual object through the virtual world, such that the position of the virtual object in the virtual world is based, at least in part, on the data associated with the location of the real world carrier.

Other exemplary implementations are directed to systems, apparatus, non-transitory computer-readable media, devices, and user interfaces for transporting virtual objects in a location-based parallel reality game.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
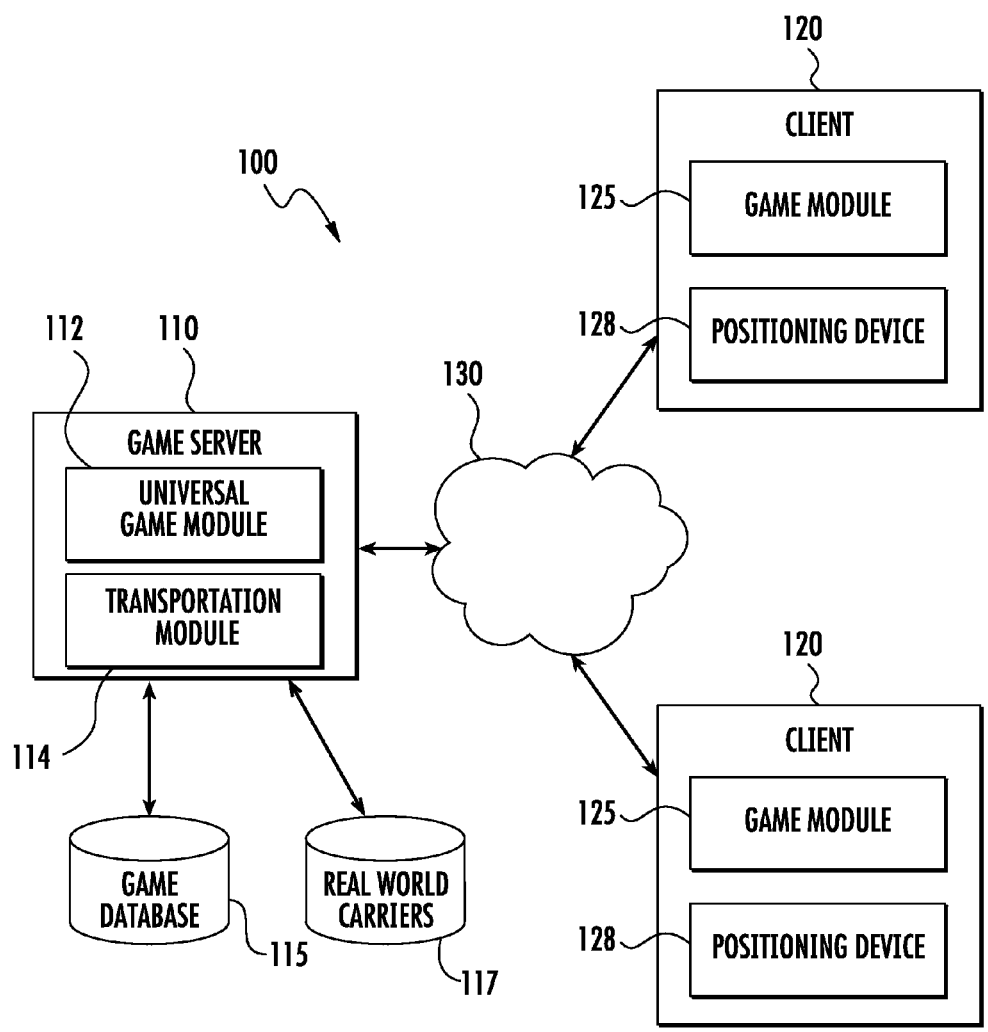
FIG. 1 depicts an exemplary computer-based system for implementing a location-based game according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Overview

Generally, the present disclosure is directed to the transportation of virtual objects within a parallel reality game having a virtual world with a geography that parallels at least a portion of the real world geography. More particularly, the transportation of virtual objects through the virtual world can be based upon data associated with the location of a real world carrier. In one exemplary embodiment, a player can cause the virtual transportation of one or more virtual objects by navigating to a location proximate to a real world carrier and transferring the virtual object to the virtual counterpart of the real world carrier. The virtual object can be transported through the virtual world along the route taken by the real world carrier at real world speeds. A second player can then receive the object by navigating to a location proximate to the destination of the real world carrier and requesting transfer of the virtual object.

In another exemplary embodiment, an entity, such as a business, sponsor, advertiser, or other entity, can request the distribution of virtual objects based upon data associated with the location of a real world carrier. In particular, new virtual objects can be generated and associated with the virtual counterpart of a real world carrier. Players can receive the virtual objects by navigating to a location proximate to the real world carrier and receiving the distributed virtual objects.

In a particular implementation, a game server can host a location-based parallel reality game having a player gaming area that includes a virtual environment with a geography that parallels at least a portion of the real world geography. Players can navigate a range of coordinates defining a virtual space in the virtual world by navigating a range of geographic coordinates in the real world. In particular, in the instance where the player consents to the use of positional data, the positions of players can be analyzed using, for instance, a positioning system (e.g. a GPS system) associated with a player's mobile device. Player position information can be provided to a game server hosting the parallel reality game over a network and can be used by the game server hosting the parallel reality game to update player locations in the virtual world. As a result, as the player continuously moves about in a range of coordinates in the real world, the player also continuously moves about in a range of coordinates in the parallel virtual world.

The virtual world can include one or more virtual objects which exist within the virtual world. A virtual object can be any transferable asset within the parallel reality game. Exemplary virtual objects include virtual currency, virtual coupons, virtual tickets, virtual energy, virtual powers, virtual weapons, or other suitable virtual objects or elements of the parallel reality game. For example, a virtual object can provide a player with increased abilities or powers or assist a player in the completion of a game objective. The use of virtual objects can provide an additional layer to the parallel reality game in which players collect a series of virtual objects. For instance, virtual objects can enhance each other when possessed by the same player.

Virtual objects can also be linked with real world objects or used in the furtherance of real world activities. Such use can provide the illusion that the virtual world is a hidden dimension of the real world that a player can interact with by playing the parallel reality game. For example, the virtual object can be a ticket which allows the player entry into an exclusive event. The virtual object can also be a virtual coupon which the player can present to a real world vendor to receive a discount or exclusive offer associated with a real world object or service.

A location-based parallel reality game necessarily includes a link between the real world and the parallel virtual world. To improve the link between the real world and the parallel virtual world, the transfer of virtual objects from one player to another can be linked to activities performed within the real world. For instance, the transportation of virtual objects through the virtual world can be linked to the location of real world carriers. Exemplary real world carriers can include buses, airplanes, trains, ferries, or any other real world carrier. For example, a designated taxi cab or delivery vehicle can be a real world carrier. As another example, a race car participating in a car race or a bicyclist participating in a bicycle race can be a real world carrier.

According to one aspect, a virtual object is transported through the virtual world such that the position of the virtual object in the virtual world is based on data associated with the location of a real world carrier. Data associated with the location of a real world carrier can take many various forms. In one embodiment, the data associated with the real world carrier can be positional data determined by a positioning system associated with the real world carrier. Transporting the virtual object based upon such data can occur at real world speeds and according to real world schedules. The transportation of the virtual object would also be subject to real world delays experienced by the real world carrier.

In one embodiment, the data associated with the location of the real world carrier can be the estimated location of the real world carrier determined using a schedule or timetable. For example, a city bus system can provide a timetable for each of the city buses operating within the bus system. Using such a timetable, the position of each city bus can be estimated for each time of the day for which the bus is in operation. Other forms of estimation can take into account known or expected routes of travel for the associated real world carrier. Such estimations can take into account numerous other factors, such as time-of-day traffic patterns, traffic reports, or any other data bearing on an estimated location of the real world carrier.

In another embodiment, the data associated with the location of the real world carrier can be an estimated location of the real world carrier determined using a delivery estimate. For example, common delivery services can provide an estimated time and date of delivery for a hypothetical parcel. Such estimates can be updated using parcel tracking services typically associated with common delivery services.

In yet another embodiment, the data associated with the location of the real world carrier can be data concerning average transportation times and routes associated with the real world carrier. Average transportation times and routes can be obtained from navigational services or other data sources.

Many other forms of data associated with the location of a real world carrier can exist in addition to the exemplary forms discussed above. One skilled in the art, in light of the disclosure contained herein, will understand that each of these forms can be used to satisfy the present disclosure.

In another aspect, players can interact with a virtual object linked to a real world carrier as it is transported through the virtual world. Interactions can modify the virtual object or provide some benefit to the player. Eligibility requirements can be imposed on players requesting interaction with the virtual object.

Further embodiments of the present disclosure enhance the link between the transportation of virtual objects through the virtual world and real world carriers by facilitating transfer of a virtual object from a player to the virtual counterpart of a real world carrier or vice versa. For example, a player can transfer a virtual object to the virtual counterpart of a real world carrier in a first location. The real world carrier can then travel from the first location to a second location and the virtual object can be transported through the virtual world based upon data associated with the location of the real world carrier. The second player can then receive transfer of the virtual object at the destination.

According to an aspect of the present disclosure, a player can be required to meet eligibility requirements to request transfer of the virtual object to or from the virtual counterpart of a real world carrier. If the player meets such eligibility requirements, then the player can be eligible to request transfer of the virtual object. Conversely, if the player does not meet such eligibility requirements, then the player can be ineligible and the player's request to transfer the virtual object can be denied.

In one implementation, a player can be required to be within a determined distance from the actual or estimated location of the real world carrier to be eligible to request transfer of the virtual object to the virtual counterpart of the real world carrier. For instance, a player can be required to be located at a position in the real world within a predetermined radius of the actual or estimated location of the real world carrier to be eligible to request transfer of the virtual object to or from the virtual counterpart of the real world carrier.

In another implementation, a player can be required to have completed a game objective to be eligible to request transfer of the virtual object to the virtual counterpart of the real world carrier. The game objective can be an objective that, when completed, furthers the player's progress in the parallel reality game or enhances the player's powers or abilities in the parallel reality game. However, the benefit of completing the game object can be limited to simply endowing eligibility to request transfer of the virtual object.

In yet another implementation, a player's eligibility to request transfer of the virtual object is determined based upon the status of a virtual lock associated with the virtual object. The lock can be unlocked using a passcode or other suitable means. The lock can also be automatically unlocked if the player requesting transfer of the virtual object meets given criteria. For example, if the second player is on the same team or faction as the first player, then the lock can automatically be unlocked for the second player.

Further aspects of the present disclosure enhance the link between the transportation of virtual objects through the virtual world and real world carriers by facilitating the distribution of virtual objects throughout the virtual world. In particular, an entity, such as a business, sponsor, advertiser, or other entity, can request the distribution of virtual objects based upon data associated with the location of a real world carrier.

In one embodiment, the virtual counterpart of a real world carrier can distribute virtual objects at predetermined intervals as it travels through the real world. For example, the virtual counterpart of a soda delivery truck can distribute a virtual coupon at its current position every 30 minutes. Players can receive the virtual coupon by navigating to a location where the virtual coupon was distributed and picking up, requesting possession, or otherwise obtaining the virtual coupon.

In other embodiments, a virtual counterpart of a real world carrier can distribute virtual objects based upon distance traveled, presence within designated distribution zones, time of day, weather conditions, or other suitable means of directing distribution. The virtual object can remain stationary at the position of distribution, be distributed to the nearest distribution zone, or be distributed in any other suitable manner.

In another embodiment, players can request distribution of a virtual coupon from the virtual counterpart of a real world carrier, as the real world carrier travels throughout the real world. Eligibility requirements can be imposed upon players requesting distribution. Exemplary requirements include requiring that the requesting player be within a determined distance from the real world carrier, that the player interacts with the real world carrier or any associated transportation infrastructure, or that the player exchanges a given amount of virtual currency.

In another aspect, the virtual counterpart of a real world carrier can generate a new virtual object. For example, the new virtual object can be generated at the time at which it is distributed.

In still another aspect, a real world carrier can distribute virtual objects in the style of a lottery. The recipient of the virtual object can be randomly chosen from a pool of participating players. Eligibility requirements can be imposed to define the pool of players.

Exemplary Location-Based Parallel Reality Gaming System

Exemplary computer-implemented location-based gaming systems according to exemplary embodiments of the present disclosure will now be set forth. The present subject matter will be discussed with reference to a parallel reality game. A parallel reality game is a location-based game having a virtual world geography that parallels at least a portion of the real world geography such that player movement and actions in the real world affect actions in the virtual world and vice versa. Those of ordinary skill in the art, using the disclosures provided herein, should understand that the subject matter of the present disclosure is equally applicable to other gaming systems. In addition, the inherent flexibility of computer-based systems allows for a great variety of possible configurations, combinations, and divisions of tasks and functionality between and among the components of the system. For instance, the systems and methods according to aspects of the present disclosure can be implemented using a single computing device or across multiple computing devices.

FIG. 1 illustrates an exemplary computer-implemented location-based gaming system 100 configured in accordance with an embodiment of the present disclosure. The location-based gaming system 100 provides for the interaction of a plurality of players in a virtual world having a geography that parallels the real world. In particular, a geographic area in the real world can be linked or mapped directly to a corresponding area in the virtual world. A player can move about in the virtual world by moving to various geographic locations in the real world. For instance, in the instance where the player consents to the use of positional data, the system 100 can analyze a player's position in the real world and update the player's position in the virtual world based on the player's current position in the real world.

Figure 2:
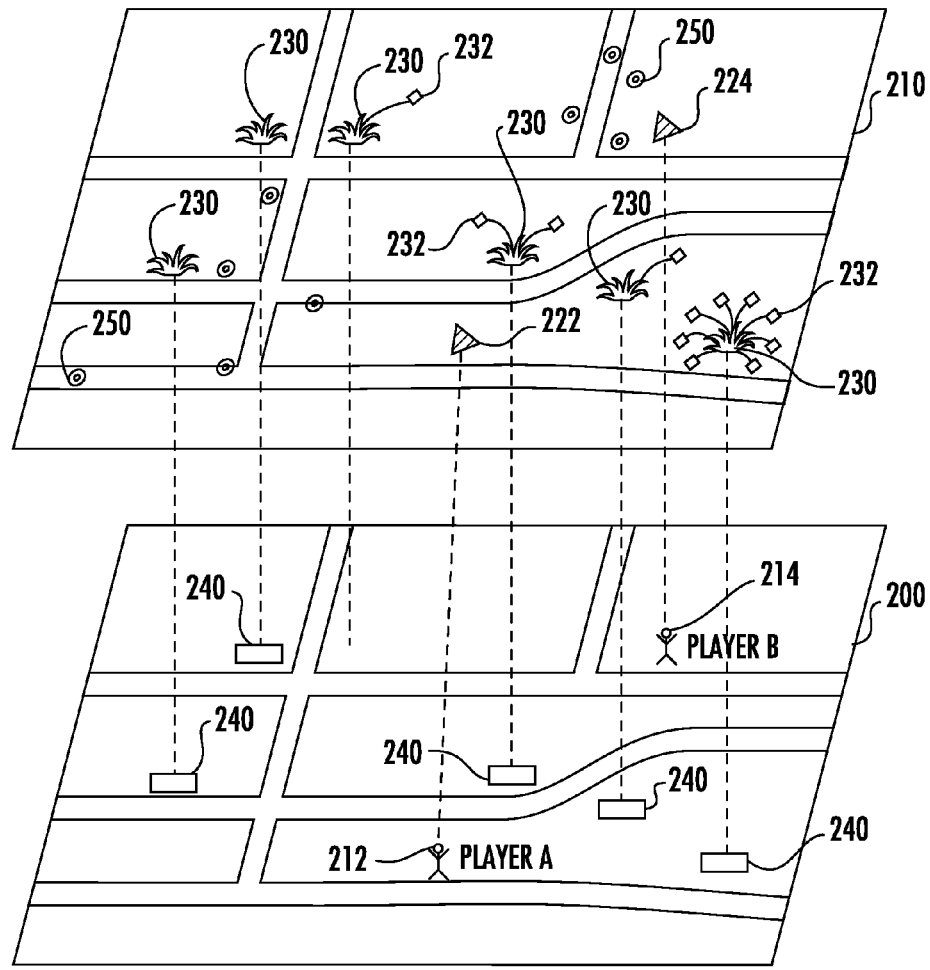
FIG. 2 depicts a conceptual representation of a virtual world having a geography that parallels the real world.

FIG. 2 depicts a conceptual diagram of a virtual world 210 that parallels the real world 200 that can act as the game board for all players of a location-based game according to an exemplary embodiment of the present disclosure. As illustrated, the virtual world 210 can include a geography that parallels the geography of the real world 200. In particular, a range of coordinates defining a geographic area or space in the real world 200 is mapped to a corresponding range of coordinates defining a virtual space in the virtual world 210. The range of coordinates in the real world 200 can be associated with a town, neighborhood, city, campus, locale, a country, continent, the entire globe, or other geographic area. Each geographic coordinate in the range of geographic coordinates in the real world 200 is mapped to a corresponding coordinate in a virtual space in the virtual world 210.

A player's position in the virtual world 210 corresponds to the player's position in the real world 200. For instance, the player A located at position 212 in the real world 200 has a corresponding position 222 in the virtual world 210. Similarly, the player B located at position 214 in the real world has a corresponding position 224 in the virtual world. As the players move about in a range of geographic coordinates in the real world, the players also move about in the range of coordinates defining the virtual space in the virtual world 210. In particular, if the player consents, a positioning system associated with a mobile device carried by the player (e.g. a GPS system) can be used to analyze the player's position as the player navigates the range of geographic coordinates in the real world 200. Data associated with the player's position in the real world 200 is used to update the player's position in the corresponding range of coordinates defining the virtual space in the virtual world 210. In this manner, players can navigate a continuous track in the range of coordinates defining the virtual space in the virtual world 210 by simply traveling among the corresponding range of geographic coordinates in the real world 200 without necessarily having to check in or periodically update location information at specific discrete locations in the real world 200.

The location-based game can include a plurality of game objectives requiring players to travel to and/or interact with various virtual elements and/or virtual objects scattered at various virtual locations in the virtual world. A player can travel to these virtual locations by traveling to the corresponding location of the virtual elements or objects in the real world. For instance, if the player consents, a positioning system can continuously analyze the position of the player such that as the player continuously navigates the real world, the player also continuously navigates the parallel virtual world. The player can then interact with various virtual elements and/or objects at the specific location to achieve or perform one or more game objectives.

For example, referring to FIG. 2, a game objective can require players to capture or claim ownership of virtual elements 230 located at various virtual locations in the virtual world 210. These virtual elements 230 can be linked to landmarks, geographic locations, or objects 240 in the real world 200. The real world landmarks or objects 240 can be works of art, monuments, buildings, businesses, libraries, museums, or other suitable real world landmarks or objects. To capture these virtual elements 230, a player must travel to the landmark or geographic location 240 linked to the virtual elements 230 in the real world and must perform any necessary interactions with the virtual elements 230 in the virtual world 210. For example, player A of FIG. 2 will have to travel to a landmark 240 in the real world 200 to interact with or capture a virtual element 230 linked with that particular landmark 240. The interaction with the virtual element 230 can require action in the real world, such as taking a photograph and/or verifying, obtaining, or capturing other information about the landmark or object 240 associated with the virtual element 230.

Game objectives can require that players use one or more virtual items that are collected by the players in the location-based game. For instance, the players may have to travel the virtual world seeking virtual items (e.g. weapons or other items) that can be useful for completing game objectives. These virtual items can be found or collected by traveling to different locations in the real world, by completing various actions in either the virtual world or the real world, or by other suitable means of collecting virtual items. In the example shown in FIG. 2, a player uses virtual items 232 to capture one or more virtual elements 230. In particular, a player can deploy virtual items 232 at locations in the virtual world 210 proximate the virtual elements 230. Deploying one or more virtual items 232 proximate a virtual element 230 can result in the capture of the virtual element 230 for the particular player or for the team and/or faction of the particular player.

In one particular implementation, a player may have to gather virtual energy as part of the location-based game. As depicted in FIG. 2, virtual energy 250 can be scattered at different locations in the virtual world 210. A player can collect the virtual energy 250 by traveling to the corresponding location of the virtual energy 250 in the actual world 200. The virtual energy 250 can be used to power virtual items and/or to perform various game objectives in the game. A player that loses all virtual energy 250 can be disconnected from the game.

According to aspects of the present disclosure, the location-based game can be a massive multi-player location-based game where every participant in the game shares the same virtual world. The players can be divided into separate teams or factions and can work together to achieve one or more game objectives, such as to capture or claim ownership of a virtual element. In this manner, the location-based game can intrinsically be a social game that encourages cooperation among players within the game. Players from opposing teams can work against each other during the location-based game. A player can use virtual items to attack or impede progress of players on opposing teams.

The location-based game can have various features to enhance and encourage game play within the location-based game. For instance, players can accumulate a virtual currency or other virtual reward that can be used throughout the game. Players can advance through various levels as the players complete one or more game objectives and gain experience within the game. Players can communicate with one another through one or more communication interfaces provided in the game. Players can also obtain enhanced "powers" or virtual items that can be used to complete game objectives within the game. Those of ordinary skill in the art, using the disclosures provided herein, should understand that various other game features can be included with the location-based game without deviating from the scope of the present disclosure.

Referring back FIG. 1, the computer-implemented location-based gaming system 100 will be discussed in more detail. The system 100 can include a client-server architecture, where a game server 110 communicates with one or more clients 120 over a network 130. Although two clients 120 are illustrated in FIG. 1, any number of clients 120 can be connected to the game server 110 over the network 130. The server 110 can host a universal gaming module 112 that controls aspects of the location-based game for all players and receives and processes each player's input in the location based game. On the client-side, each client 120 can include a gaming module 125 that operates as a gaming application so as to provide a user with an interface to the system 100. The game server 110 transmits game data over the network 130 to the client 120 for use by the gaming module 125 at the client 120 to provide local versions (e.g. portions of the virtual world specific to player locations) of the game to players at locations remote from the game server 110.

It will be appreciated that the term "module" refers to computer logic utilized to provide desired functionality. Thus, a module can be implemented in hardware, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM hard disk or optical or magnetic media.

The game server 110 can be any computing device and can include a processor and a memory. The memory can store instructions which cause the processor to perform operations. The game server 110 can include or can be in communication with a game database 115. The game database 115 stores game data used in the location-based game to be served or provided to the client(s) 120 over the network 130.

The game data stored in the game database 115 can include: (1) data associated with the virtual world in the location-based game (e.g. imagery data used to render the virtual world on a display device, geographic coordinates of locations in the virtual world, etc.); (2) data associated with players of the location-based game (e.g. player information, player experience level, player currency, current player positions in the virtual world/real world, player energy level, player preferences, team information, faction information, etc.); (3) data associated with game objectives (e.g. data associated with current game objectives, status of game objectives, past game objectives, future game objectives, desired game objectives, etc.); (4) data associated virtual elements in the virtual world (e.g. positions of virtual elements, types of virtual elements, game objectives associated with virtual elements; corresponding actual world position information for virtual elements; behavior of virtual elements, relevance of virtual elements etc.); (5) data associated with real world objects, landmarks, positions linked to virtual world elements (e.g. location of real world objects/landmarks, description of real world objects/landmarks, relevance of virtual elements linked to real world objects, etc.); (6) Game status (e.g. current number of players, current status of game objectives, player leaderboard, etc.); (7) data associated with player actions/input (e.g. current player positions, past player positions, player moves, player input, player queries, player communications, etc.); and (8) any other data used, related to, or obtained during implementation of the location-based game. The game data stored in the game database 115 can be populated either offline or in real time by system administrators and/or by data received from users/players of the system 100, such as from one or more clients 120 over the network 130.

As will be discussed in further detail below, the game server 110 can include or can also be in communication with a real world carriers database 117. The real world carriers database 117 can be a part of, integral with, or separate from the game database 115. The real world carriers database 117 can also store data associated with the location of a real world carrier (e.g. positional data determined by a positioning system associated with the real world carrier, an estimated location of the real world carrier determined using a schedule or timetable associated with the real world carrier, an estimated location of the real world carrier determined using a delivery estimate associated with the real world carrier, data concerning average transportation times and routes associated with the real world carrier, or other suitable forms of data). The real world carriers database 117 can also store data associated with real world conditions, such as the aggregate locations of players in the real world; local data providing locations of cultural value or commercial value; map data providing the locations of roads, highways, and waterways; current and past locations of individual players; hazard data; weather data; event calendar data; and other suitable data.

The data stored in the real world carriers database 117 can be collected or obtained from any suitable source. For example, in one aspect, the real world carriers database 117 can access positional data determined by a positioning system associated with the real world carrier. In other aspects, the real world carriers database 117 can access schedules or timetables associated with a real world carrier, delivery estimates associated with a real world carrier, or average transportation times and routes associated with a real world carrier.

The real world carriers database 117 can also be coupled to, include, or be part of a map database storing map information, such as one or more map databases accessed by a mapping service. According to another exemplary aspect, the real world carriers database 117 can obtain or access data associated with past and current locations of players, for instance, from the game database 115. According to yet another exemplary aspect, the real world carriers database 117 can be coupled to one or more external data sources or services that periodically provide population data, hazard data, weather data, event calendar data, or other data to the real world carriers database 117.

The game server 110 can be configured to receive requests for game data from one or more clients 120 (for instance, via remote procedure calls (RPCs)) and to respond to those requests via the network 130. For instance, the game server 110 can encode game data in one or more data files and provide the data files to the client 120. In addition, the game server 110 can be configured to receive game data (e.g. player positions, player actions, player input, etc.) from one or more clients 120 via the network 130. For instance, the client device 120 can be configured to periodically send player input, player location, and other updates to the game server 110, which the game server 110 uses to update game data in the game database 115 to reflect any and all changed conditions for the game.

As illustrated, the game server 110 can include a universal game module 112. The universal game module 112 hosts the location-based game for all players and acts as the authoritative source for the current status of the location-based game for all players. The universal game module 112 receives game data from clients 120 (e.g. player input, player position, player actions, player status, landmark information, etc.) and incorporates the game data received into the overall location-based game for all players of the location-based game. The universal game module 112 can also manage the delivery of game data to the clients 120 over the network 130.

According to an exemplary embodiment of the present disclosure, the game server 110 can also include a transportation module 114. The transportation module 114 can be a part of or separate from the universal game module 112. Transportation module 114 can access real world carriers database 117 to retrieve data associated with the location of a real world carrier. The transportation module 114 can be configured to access data associated with real world carriers, analyze the data, and determine locations in the virtual world to locate virtual objects in the virtual world based on the data associated with real world carriers. For instance, the transportation module 114 can modify game data stored in the game database 115 to locate virtual objects in the virtual world at locations determined based on the data associated with real world carriers.

Other modules can be used with the game server 110. Any number of modules can be programmed or otherwise configured to carry out the server-side functionality described herein. In addition, the various components on the server-side can be rearranged. For instance, the game database 115 can be integrated into the game server 110. Other configurations will be apparent in light of this disclosure and the present disclosure is not intended to be limited to any particular configuration.

A client 120 can be any portable computing device that can be used by a player to interact with the gaming system 100. For instance, a client 120 can be a wireless device, a personal digital assistant (PDA), portable gaming device, cellular phone, smart phone, tablet, navigation system, handheld GPS system or other such device. In short, a client 120 can be any computer-device or system that can execute a gaming module 125 to allow a player to interact with the game system 100.

The client 120 can include a processor and a memory. The memory can store instructions which cause the processor to perform operations. The client 120 can include various input/output devices for providing and receiving information from a player, such as a display screen, touch screen, touch pad, data entry keys, speakers, and/or a microphone suitable for voice recognition. The client 120 can further include a network interface for providing communications over the network 130.

The gaming module 125 executed by the client 120 provides an interface between a player and the location-based game. The gaming module 125 can present a user interface on a display device associated with the client 120 that displays a virtual world associated with the game and allows a user to interact in the virtual world to perform various game objectives. The gaming module 125 can also control various other outputs to allow a player to interact with the game without requiring the player to view a display screen. For instance, the gaming module 125 can control various audio, vibratory, or other notifications that allow the player to play the game without looking at the display screen. The gaming module 125 can access game data received from the game server 110 to provide an accurate representation of the game to the user. The gaming module 125 can receive and process player input and provide updates to the game server 110 over the network 130.

Because the gaming system 100 is for a location-based game, the client 120 is preferably a portable computing device, such as a smartphone or other portable device that can be easily carried or otherwise transported with a player. A player can interact with the virtual world simply by carrying or transporting the client 120 in the actual world. The client 120 can include a positioning device 128 that analyzes the position of a player during game play if the player consents. The positioning device 128 can be any device or circuitry for analyzing the position of the client 120. For example, the positioning device 128 can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position.

In the instance in which the player consents to the use of positional data, the positioning device 128 analyzes the position of the player as the player moves around with the client 120 in the real world and provides the player position information to the gaming module 125. The gaming module 125 updates the player position in the virtual world based on the actual position of the player in the real world. In particular, the location of the player in the virtual world can correspond to the location of the player in the real world. The gaming module 125 can provide player position information to the game server 110 over the network 130 such that the universal gaming module 112 keeps track of all player positions throughout the game.

It should be understood that location information associated with a player is utilized only if permission is granted after the player has been notified that location information of the player is to be accessed and how the location information is to be utilized in the context of the game (e.g. to update player position in the virtual world). In addition, any location information associated with players will be stored, handled, and maintained in a manner to protect player privacy.

The network 130 can be any type of communications network, such as a local area network (e.g. intranet), wide area network (e.g. Internet), or some combination thereof. The network can also include a direct connection between a client 120 and the game server 110. In general, communication between the game server 110 and a client 120 can be carried via a network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

Exemplary User Interface

Figure 3:
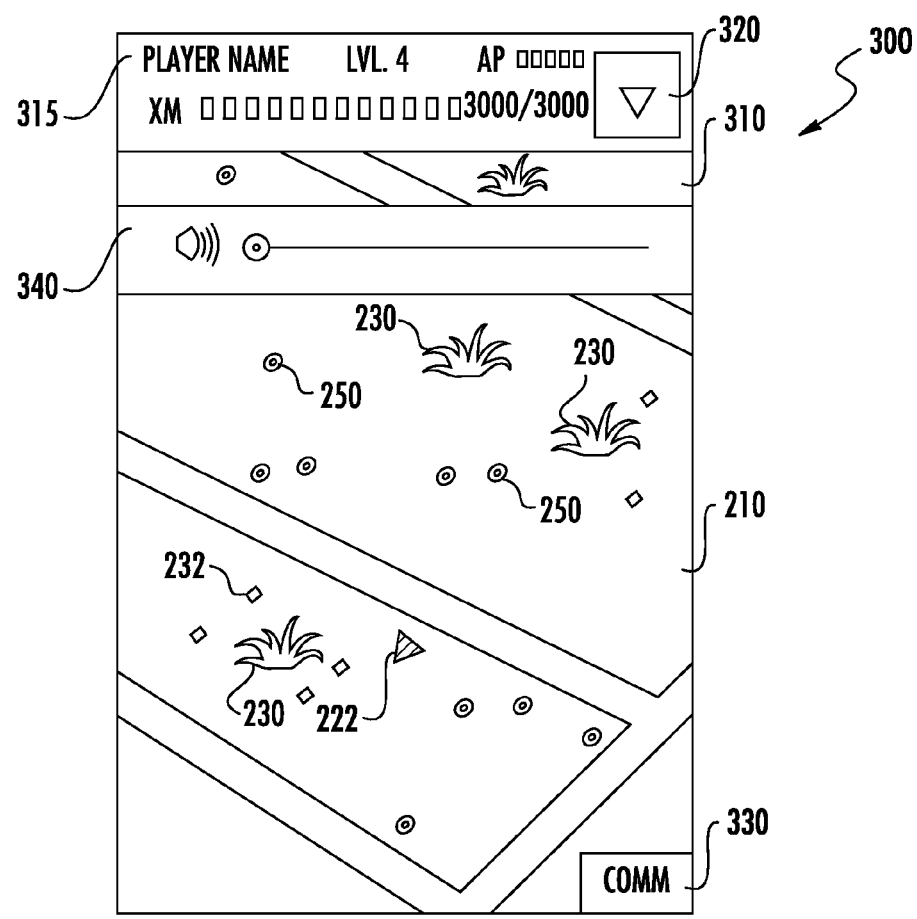
FIG. 3 depicts an exemplary user interface of a location-based game according to an exemplary embodiment of the present disclosure.

FIG. 3 depicts one particular embodiment of a user interface 300 that can be presented on a display of a client 120 as part of the interface between a player and the gaming system 100. The user interface 300 includes a display window 310 that can be used to display the virtual world 210 and various other aspects of the game, such as player position 222 and the locations of virtual elements 230, virtual items 232 and virtual energy 250 in the virtual world 210. The user interface 300 can also display other information, such as game data information, game communications, player information, and other information associated with the game. For example, the user interface can display player information 315, such as player name, experience level and other information. The user interface 300 can include a menu 320 for accessing various game settings and other information associated with the game. The user interface 300 can also include a communications interface 330 that enables communications between the game system and the player and between one or more players of the location-based game.

According to aspects of the present disclosure, a player can interact with the location-based game by simply carrying a client device around in the real world. For instance, a player can play the location-based game by simply accessing an application associated with the location based game on a smartphone and moving about in the real world with the smartphone. In this regard, it is not necessary for the player to continuously view a visual representation of the virtual world on a display screen to play the location based game. As a result, the user interface 300 can include a plurality of non-visual elements that allow a user to interact with the game. For instance, the user interface can provide audible notifications to the player when the player is approaching a virtual element or object in the game or when an important event happens in the location-based game. A player can control these audible notifications with audio control 340. Different types of audible notifications can be provided to the user depending on the type of virtual element or event. The audible notification can increase or decrease in frequency or volume depending on a player's proximity to a virtual element or object. Other non-visual notifications and signals can be provided to the user, such as a vibratory notification or other suitable notifications or signals.

Those of ordinary skill in the art, using the disclosures provided herein, should understand that numerous user interface configurations and underlying functionalities will be apparent in light of this disclosure. The present disclosure is not intended to be limited to any one particular configuration.

Exemplary Server-Client Flow Diagram

Figure 4A:
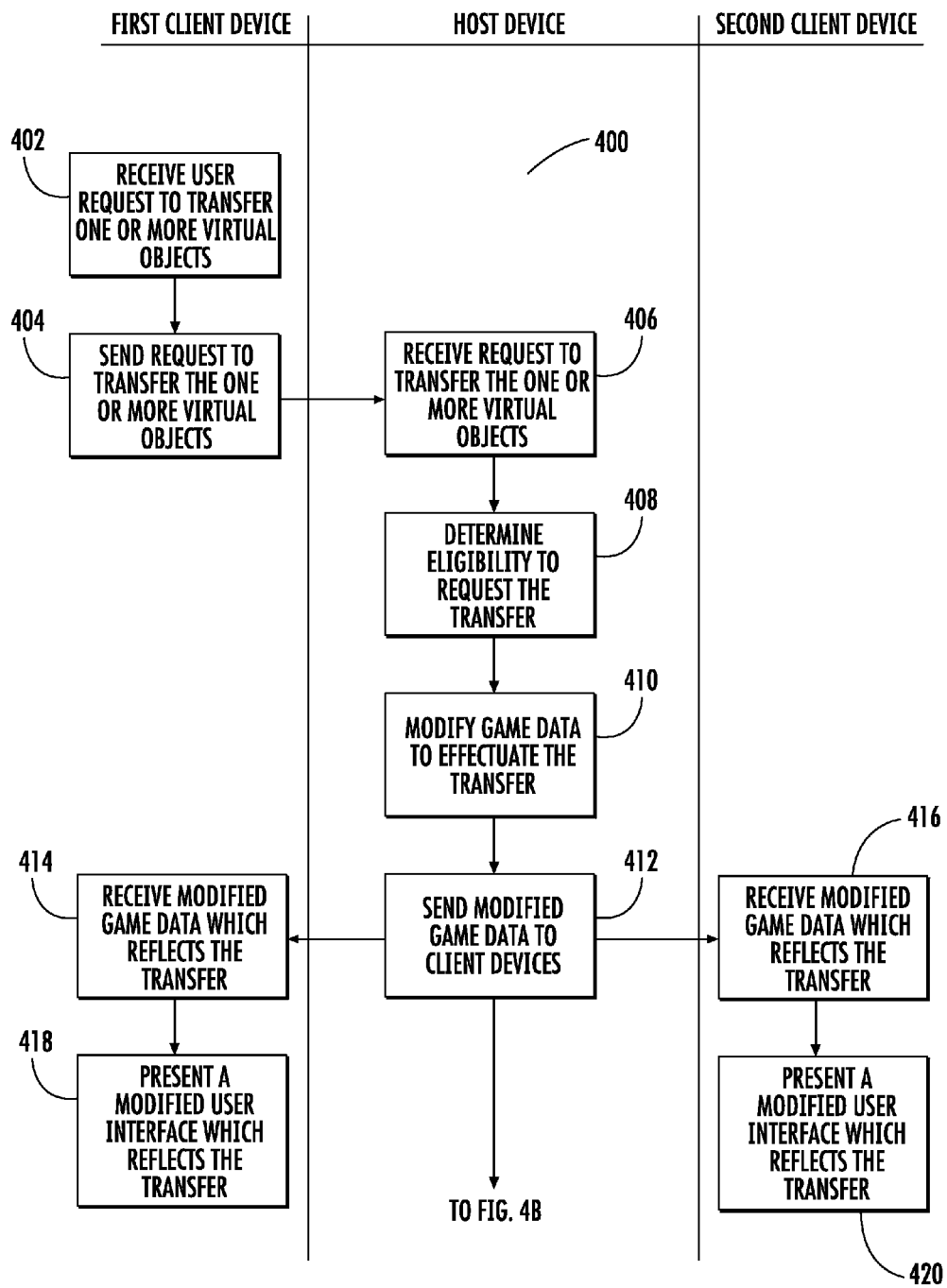
FIGS. 4A-C depict a client-server flow diagram of a method for transporting virtual objects through a virtual world based upon data associated with the location of a real world carrier according to an exemplary embodiment of the present disclosure.
Figure 4B:
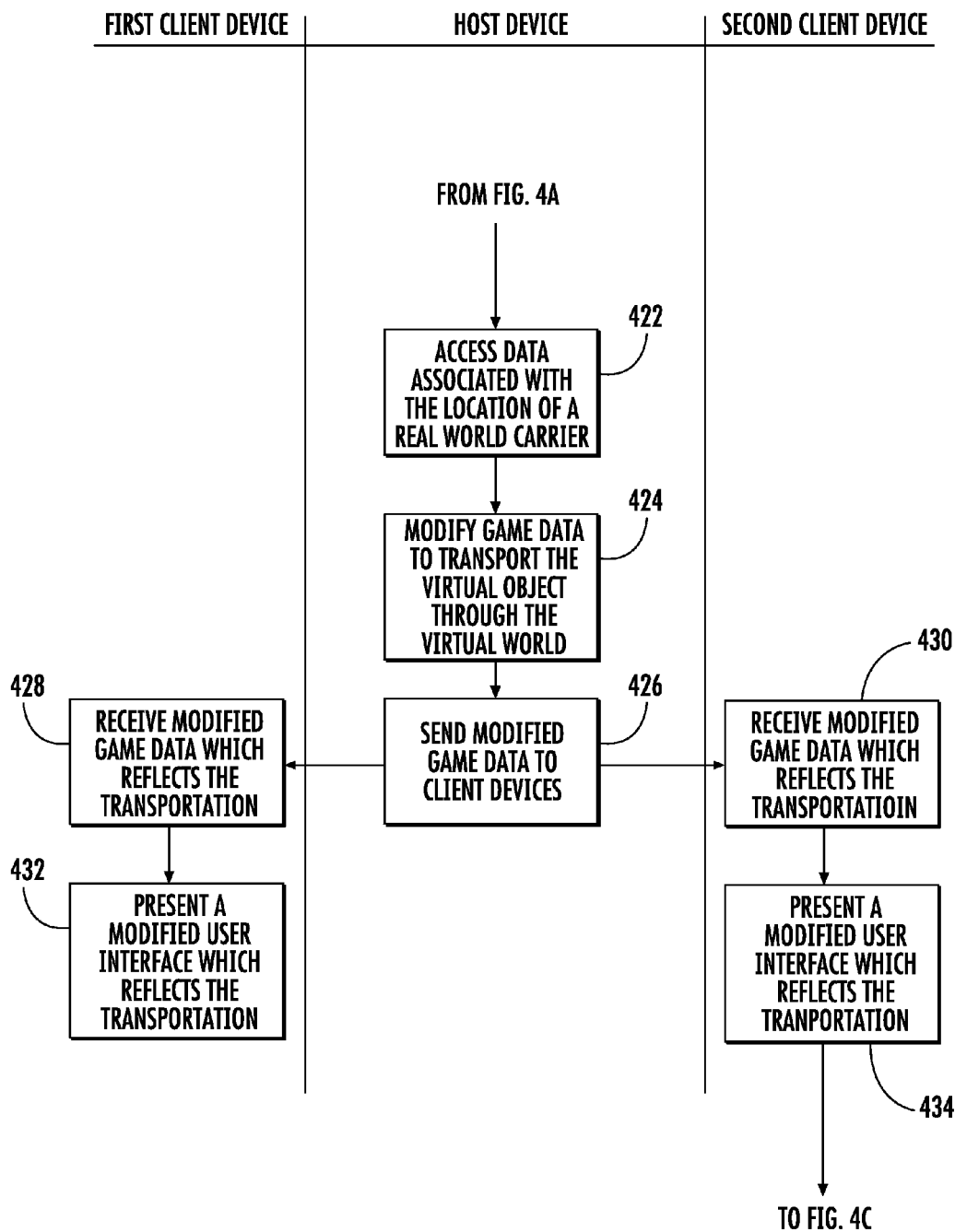
Figure 4C:
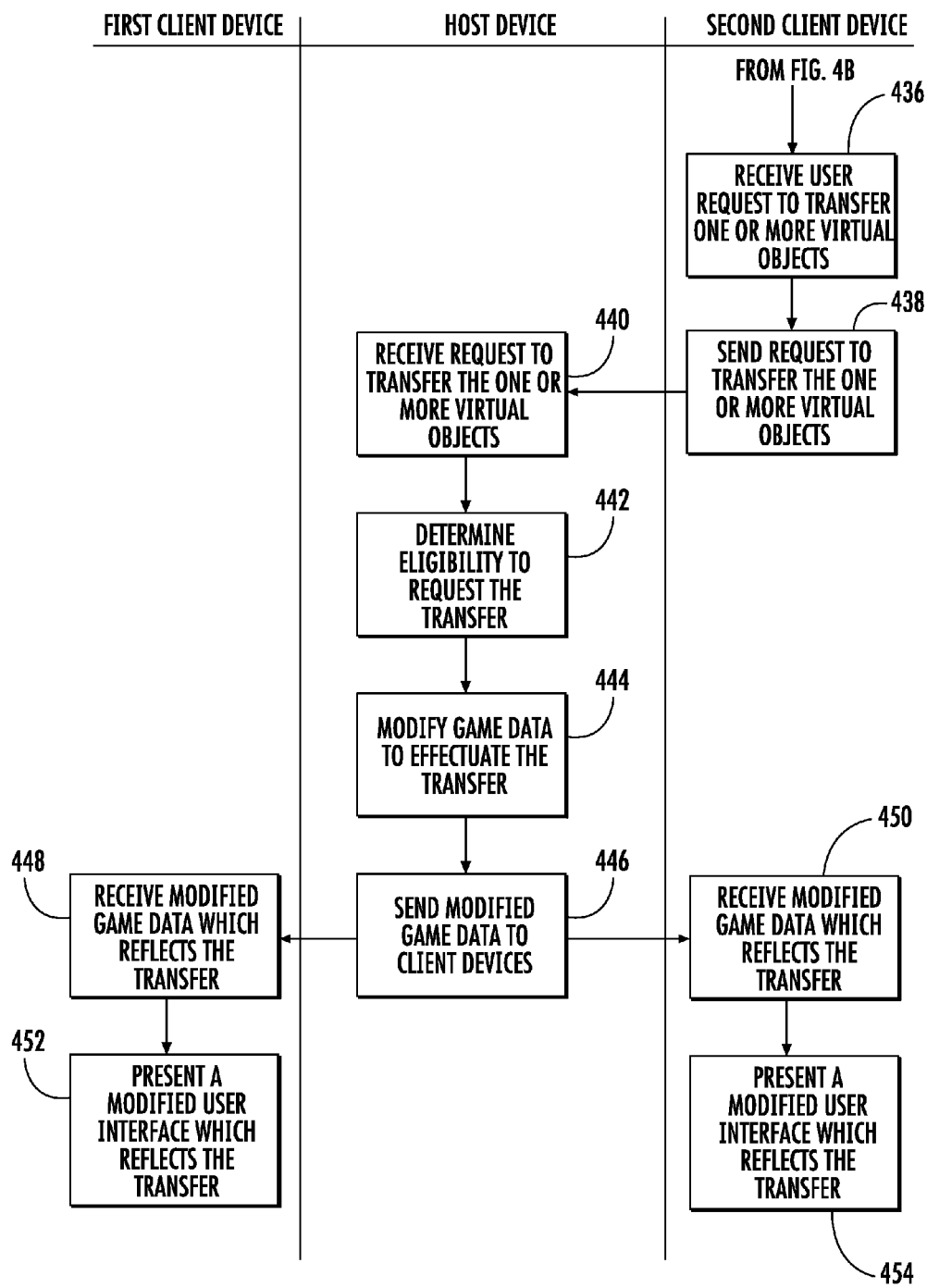

FIGS. 4A-4C depict a client-server flow diagram of an exemplary method (400) for transporting virtual objects through a virtual world based upon data associated with the location a real world carrier according to an exemplary embodiment of the present disclosure. The exemplary method (400) can be implemented using any suitable computing system, such as the client-server arrangement of the system 100 of FIG. 1. In particular, the first client device and the second client device can be implemented by two clients 120 and the host device can be implemented by game server 110. In addition, although FIGS. 4A-4C depict steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

Referring to FIG. 4A, at (402) the first client device receives a user request to transfer one or more virtual objects to the virtual counterpart of a real world carrier. Exemplary real world carriers can include buses, airplanes, trains, ferries, or any other real world carrier. For example, a designated taxi cab or delivery vehicle can be a real world carrier. As another example, a race car participating in a car race or a bicyclist participating in a bicycle race can be a real world carrier.

At (404) the first client device sends a request to a host device to transfer one or more virtual objects from the first player to the virtual counterpart of a real world carrier. At (406) the host device receives the request from the first client device to transfer the one or more virtual objects from the first player to the virtual counterpart of the real world carrier.

At (408) the host device determines eligibility to request the transfer of the virtual object. A player and any associated client device can be required to meet eligibility requirements to request transfer of the virtual object to or from the virtual counterpart of a real world carrier. If the player meets such eligibility requirements then the player can be eligible to request transfer of the virtual object. Conversely, if the player does not meet such eligibility requirements then the player can be ineligible and the player's request to transfer the virtual object can be denied.

In one implementation, a player can be required to be within a determined distance from the actual or estimated location of a real world carrier to be eligible to request transfer of the virtual object to the virtual counterpart of the real world carrier. A player's presence within a determined distance from a real world carrier can be verified using several different techniques. For example, the player can use a client device to participate in the parallel reality game. If it is determined that the client device is located within the determined distance when it operates to request transfer of the virtual object then the player may be deemed to also be within the determined distance. One of skill in the art, using the disclosures provided herein, will understand that there are many various ways to determine the position of a client device or other computing device, including, but not limited to, GPS navigation, cellular triangulation, and dead reckoning.

A player's presence within a determined distance from a real world carrier can be verified by requiring that the player interact with a real world item at a given location. For instance, if a player desires to transfer a virtual object to the virtual counterpart of a train which is currently stopped in the Philadelphia Train Station, then the player's presence within a determined distance from the train can be verified by requiring that the player photograph the train. Other exemplary forms of verification can require that a player photograph the interior or exterior of the Philadelphia Train Station, scan a QR-Code located at a given location, or otherwise interact with a real world vendor, advertisement or other suitable real world object.

In another implementation, a player can be required to have completed a game objective to be eligible to request transfer of the virtual object to the virtual counterpart of the real world carrier. The game objective can be an objective that, when completed, furthers the player's progress in the parallel reality game or enhances the player's powers or abilities in the parallel reality game. However, the benefit of completing the game objective can be limited to simply endowing eligibility to request transfer of the virtual object.

The game objective can be directly linked with a data collection activity. An exemplary game objective directly linked with data collection activity can include a task that involves acquiring information about the real world and providing this information as a condition for completion of the game objective. For example, a game objective can require a player to take a photograph of a particular landmark, art object, store front, or other feature located in the real world.

The game objective can be indirectly linked with a data collection activity. An exemplary game objective indirectly linked with data collection activity can include placing virtual objects at particular locations in the virtual world so that actions players take to interact with the virtual objects indirectly reveal information about the real world. For instance, one can place a virtual object in a park, hiking area, or other locale. By analyzing player movements in the virtual world to navigate to the virtual object, the game system can also analyze corresponding movements in the real world, providing an indication of the location of traversable paths in an the area.

Returning to FIG. 4A, if it is determined at (408) that the first player associated with the first client device is eligible to request the transfer of the virtual object, then at (410) the host device modifies game data to effectuate the transfer of the virtual object from the player to the virtual counterpart of the real world carrier. At (412) the host device sends the modified game data to the first client device and the second client device. At (414) and (416) the first client device and the second client device respectively receive the modified game data which reflects the transfer. At (418) and (420) the first client device and the second client device respectively present a modified user interface which reflects the transfer of the virtual object from the player to the virtual counterpart of the real world carrier.

Referring to FIG. 4B, at (422) the host device accesses data associated with the location of a real world carrier. Data associated with the location of a real world carrier can take many various forms and, in some aspects, the use of such data must be approved prior to the host device accessing such data.

In one embodiment, the data associated with the real world carrier can be positional data determined by a positioning system associated with the real world carrier. For example, a commercial airline flight can regularly determine its geographic location using an onboard satellite navigation system. Such geographic location can be consistently reported or analyzed and used to update data concerning the location of the virtual counterpart of the commercial airline flight in real time.

While GPS navigation has been used here as an example, one skilled in the art, in light of the disclosures contained herein, will understand that many other forms of positioning systems can be used instead. For example, cell tower triangulation can be used to determine the location of a real world carrier which communicates using cell technology or emits a cellular signal. Other exemplary forms of positioning systems include the use of radio, ultrasound, laser, or infrared signals or other suitable positioning systems to analyze the position of the real world carrier.

In another embodiment, the data associated with the location of the real world carrier can be the estimated location of the real world carrier determined using a schedule or timetable. For example, a city bus system can provide a timetable for each of the city buses operating within the bus system. Using such a timetable, the position of each city bus can be estimated for each time of the day for which the bus is in operation. To illustrate, if the timetable associated with Seattle Metro Bus 44 shows that Bus 44 is scheduled to arrive at the corner of 45th Street and Brooklyn Avenue at 8:00 AM, then the virtual counterpart of Bus 44 can be located, in the virtual world, at the corner of 45th Street and Brooklyn Avenue at 8:00 AM.

Other forms of estimation can take into account known or expected routes of travel for the associated real world carrier. For example, if it is known that Bus 44 will travel westward on 45th Street following its 8:00 AM stop at the corner of 45th Street and Brooklyn Avenue and is scheduled to arrive at the corner 45th Street and Stone Way at 8:10 AM, then at 8:05 AM the virtual counterpart of Bus 44 can be virtually located on 45th Street halfway between Brooklyn Avenue and Stone Way. Such estimations can take into account numerous other factors, such as time-of-day traffic patterns, traffic reports, or any other data bearing on an estimated location of the real world carrier.

In yet another embodiment, the data associated with the location of the real world carrier can be can be an estimated location of the real world carrier determined using a delivery estimate. For example, participating common delivery services can provide an estimated time and date of delivery for a hypothetical parcel. To illustrate, if the virtual object to be transported is a large virtual sword, the common delivery service can be provided with an estimated size and weight of the virtual object, as if the virtual object existed in the real world. Taking such parameters into account, the participating common delivery service can provide a realistic delivery estimate of the time and route associated with delivery of such a parcel. If the parcel would be transported in the real world using a series of real world carriers such as a common delivery service cargo airplane and a common delivery service ground delivery truck, the location of each of these real world carriers can be estimated using the delivery estimate. Such estimates can be updated using parcel tracking services typically associated with common delivery services. In addition, while a delivery estimate prepared using hypothetical size and weight parameters has been used here as an example, other forms of delivery estimates can satisfy the present disclosure.

In yet another embodiment, the data associated with the location of the real world carrier can be data concerning average transportation times and routes associated with the real world carrier. Average transportation times and routes can be obtained from navigational services or other data sources. The data can include the most frequently traveled route, the route of shortest distance, the route of shortest estimated temporal duration, or some other method of selecting a route. The location of the real world carrier can be estimated using a weighted average of all available routes such that the estimated location of the real world carrier as it travels from origin to destination does not correspond identically with any single available route.

Many other forms of data associated with the location of a real world carrier can exist in addition to the exemplary forms discussed above. One of ordinary skill in the art, in light of the disclosures contained herein, will understand that each of these forms can be used without deviating from the present disclosure.

Returning to FIG. 4B, at (424) the host device modifies game data to transport the virtual object through the virtual world. The transportation of the virtual object through the virtual world can be performed in a manner such that the position of the virtual object in the virtual world is based at least in part on the data associated with the location of the real world carrier. For example, a virtual object can be associated with the virtual counterpart of a train travelling from New York to Miami. The location of the virtual object in the virtual world can be dependent upon the location of the train in the real world. If the train is currently stopped at the Philadelphia Train Station, then the virtual object can be located at a position in the virtual world which parallels the Philadelphia Train Station. As such, the virtual object can be transported at real world speeds and subject to real world delays.

In a particular aspect of the present disclosure, players can interact with a virtual object linked to a real world carrier as it is transported through the virtual world. For example, a virtual pizza can be linked with the bicycle racer and transported through the virtual world according to the position of the bicycle racer along the race track. As the bicycle racer passes players observing the race, players can participate and interact with the virtual pizza by, for example, selecting and adding virtual toppings to the pizza. At the end of the race, the virtual pizza can be displayed or otherwise highlighted. For example, participating players may receive a virtual coupon which entitles them to a free slice of pizza with toppings corresponding to those of the virtual pizza. Allowing players to interact with a virtual object enhances the illusion that the virtual world is a hidden dimension of the real world that a player can interact with by playing the parallel reality game.

Returning to FIG. 4B, at (426) the host device sends the modified game data to the first client device and the second client device. At (428) and (430) the first client device and the second client device respectively receive the modified game data which reflects the transportation of the virtual object through the virtual world. At (432) and (434) the first client device and the second client device respectively present a modified user interface which reflects the transportation of the virtual object through the virtual world.

Referring to FIG. 4C, at (436) the second client device receives a user request to transfer one or more virtual objects from the virtual counterpart of a real world carrier to a second player. At (438) the second client device sends a request to a host device to transfer one or more virtual objects from the virtual counterpart of a real world carrier to the second player. At (440) the host device receives the request from the second client device to transfer the one or more virtual objects from the virtual counterpart of the real world carrier to the second player.

At (442) the host device determines eligibility to request the transfer of the virtual object. As discussed above, a player and any associated client device can be required to meet eligibility requirements to request transfer of the virtual object to or from the virtual counterpart of a real world carrier. Each of the aspects of the present disclosure discussed above with regard to determining eligibility at (408) apply to (442) in an analogous fashion.

In further aspects, a player's eligibility to request transfer of the virtual object is determined based upon the status of a virtual lock associated with the virtual object. For example, a first player can place a virtual lock on the virtual object prior to transferring the virtual object to the virtual counterpart of a real world carrier. For a second player to be eligible to request transfer of the virtual object from the virtual counterpart of the real world carrier, the second player must first unlock the lock. The lock can be unlocked using a passcode or other suitable means. The lock can also be automatically unlocked if the player requesting transfer of the virtual object meets given criteria. For example, if the second player is on the same team or faction as the first player, then the lock can automatically be unlocked for the second player.

The virtual lock can be subjected to attempts by a third player to crack the lock. Exemplary forms of cracking the lock can include solving a puzzle, completing a game objective, or using an appropriate virtual object, such as a virtual lock pick. Restrictions can placed upon when and where the virtual lock can be subjected to attempts to crack the lock. For instance, if a virtual object is associated with a train travelling from New York to Miami, a third player located in Philadelphia can only attempt to crack the virtual lock on the virtual object during the time in which the train is stopped at the Philadelphia Train Station. Further, the third player may be required to be within a determined distance or meet other eligibility criteria to be eligible to attempt to crack the lock.

In other implementations, the virtual lock on the virtual object can respond negatively to attempts to crack the lock. For example, the virtual object may self-destruct if the virtual lock on the virtual object is cracked, subjected to an attempt to crack, or otherwise triggered. Rather than self-destruct, the virtual object can be set to explode or otherwise cause damage to a third player who cracks the lock or otherwise illegitimately receives the virtual object.

Returning to FIG. 4C, if it is determined at (442) that the second player associated with the second client device is eligible to request the transfer of the virtual object, then at (444) the host device modifies game data to effectuate the transfer of the virtual object from the virtual counterpart of the real world carrier to the second player. At (446) the host device sends the modified game data to the first client device and the second client device. At (448) and (450) the first client device and the second client device respectively receive the modified game data which reflects the transfer. At (452) and (454) the first client device and the second client device respectively present a modified user interface which reflects the transfer of the virtual object from the player to the virtual counterpart of the real world carrier.

Exemplary Representation of Virtual Object Transportation

Figure 5:
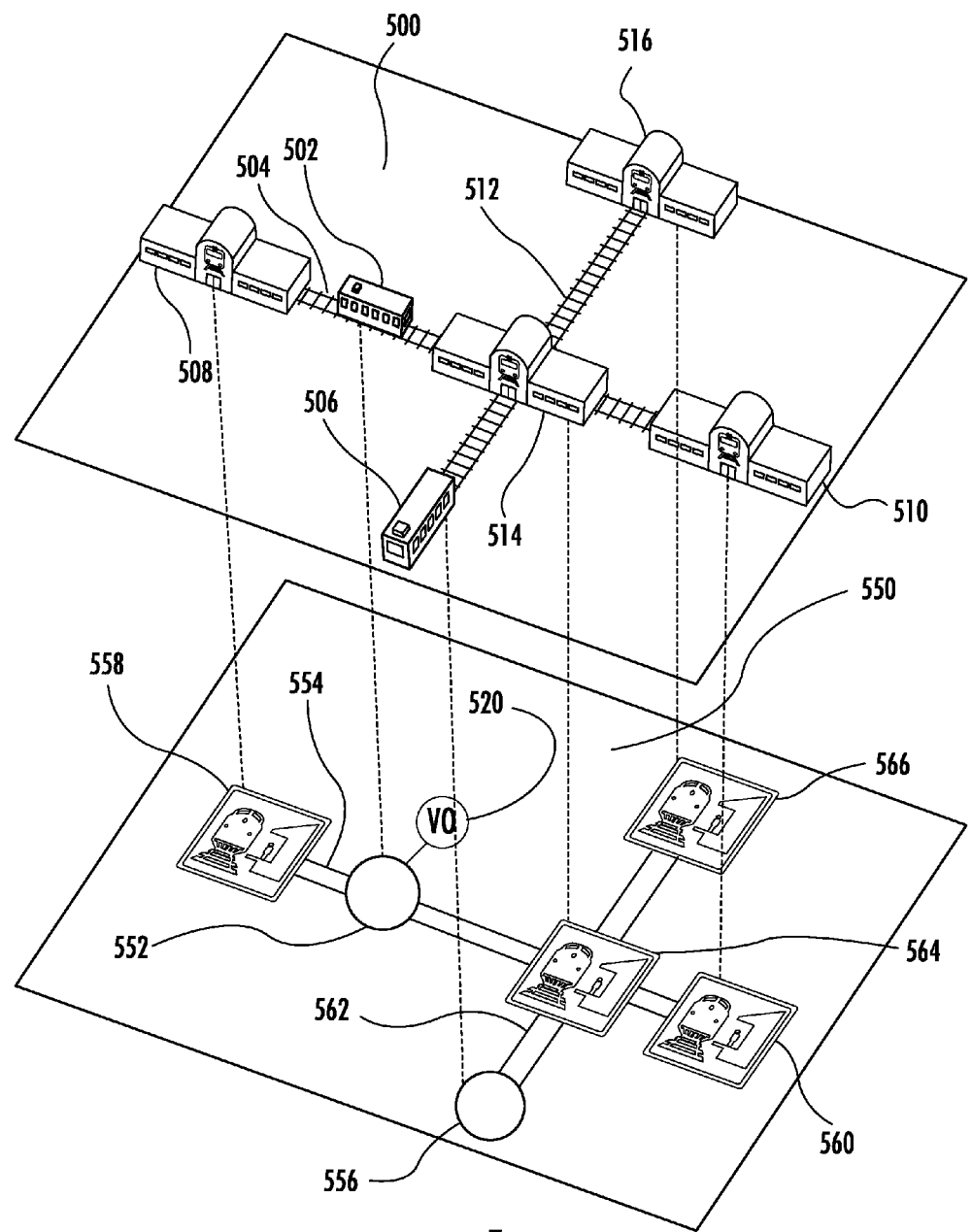
FIG. 5 depicts a conceptual representation of a virtual world through which a virtual object is transported based upon data associated with the location of a real world carrier according to an exemplary embodiment of the present disclosure.

FIG. 5 depicts a conceptual representation of a virtual world through which a virtual object is transported based upon data associated with the location of a real world carrier according to an exemplary embodiment of the present disclosure. Depicted in FIG. 5 is real world carrier system 500. Real world carrier 502 can travel along real world carrier route 504. Real world carrier route 504 extends from real world station 508 to real world station 510. Real world carrier route 504 intersects with real world carrier route 512 at real world station 514. Real world carrier route 512 extends to real world station 516. Real world carrier 506 can travel along real world carrier route 512.

Also depicted in FIG. 5 are the virtual counterparts to each of the real world objects described above as presented in exemplary user interface 300. The virtual counterpart to real world carrier system 500 is shown as virtual carrier system 550. The virtual counterpart to real world carrier 502 is shown as virtual carrier 552. The virtual counterparts of each of real world stations 508, 510, 514, and 516 are respectively shown as virtual stations 558, 560, 564, and 566. The virtual counterparts of each of real world carrier routes 504 and 512 are respectively shown as virtual routes 554 and 562. The virtual counterpart of real world carrier 506 is shown as virtual carrier 556.

Virtual object 520 can be associated with or otherwise linked to virtual carrier 552, which is the virtual counterpart of real world carrier 502. As real world carrier 502 moves about the real world, the parallel reality game can update the position of virtual carrier 552 such that the position of virtual carrier 552 in the virtual world parallels the location of real world carrier 502 in the real world. The position of virtual object 520 can be updated and modified such the position of virtual object 520 in the virtual world is the same as that of virtual carrier 552. In such fashion, virtual object 520 can be transported through the virtual world such that virtual object 520's position in the virtual world is based at least on part on data associated with the location of real world carrier 502 in the real world.

In another embodiment, virtual object 520 can be associated with or otherwise linked with real world carrier system 500. Virtual object 520 can be linked to a first virtual counterpart of a first real world carrier within real world carrier system 500, such as virtual carrier 552. The virtual object can then be transferred from virtual carrier 552 to a second virtual counterpart of a second real world carrier, such as virtual carrier 556, if necessary to reach the virtual object's ultimate destination. To illustrate, a first player located at real world station 508 can transfer virtual object 520 to virtual carrier 552 as real world carrier 502 passes through real world station 508. Virtual object 520 can then be transferred from virtual carrier 552 to virtual carrier 556 at real world station 514. Finally, virtual object 520 can be transferred from virtual carrier 556 to a second player located at real world station 516. One skilled in the art, in light of the disclosures contained herein, would recognize the availability of alternative methods of embodying the present disclosure. For example, virtual object 520 can be held at virtual station 564 if simultaneous transfer from the virtual carrier 552 to virtual carrier 556 is not available. For instance, if real world carrier 502 exits real world station 514 prior to real world carrier 506 entering real world station 514, then virtual object 520 can be transferred and held at virtual station 564 and await first available transfer to virtual carrier 556. Another alternative embodiment may account for multiple available routes within the real world carrier system 500 and choose amongst such routes depending upon given criteria.

Exemplary Distribution of Virtual Objects Diagram

Figure 6:
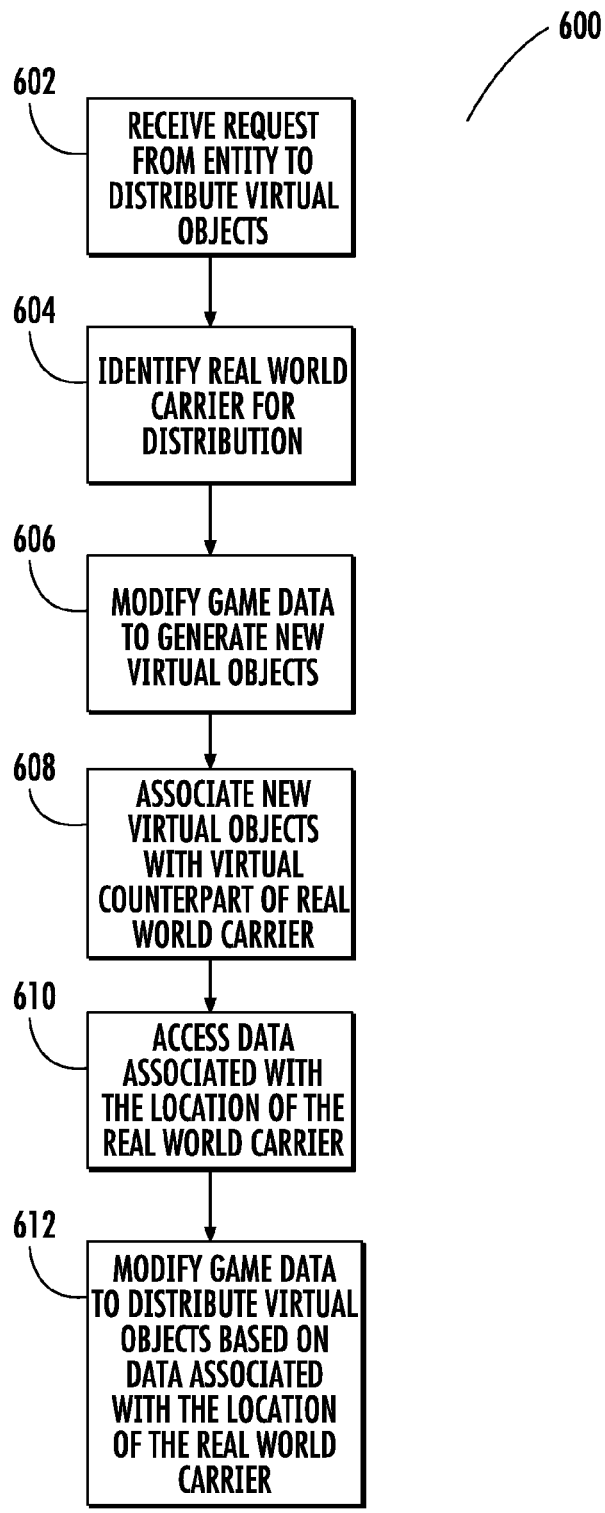
FIG. 6 depicts a flow diagram for a method of distributing virtual items throughout a virtual world based upon data associated with the location of a real world carrier according to an exemplary embodiment of the present disclosure.

FIG. 6 depicts a flow diagram for an exemplary method (600) of distributing virtual items throughout the virtual world. The exemplary method (600) can be implemented using any suitable computing system, such as the client-server arrangement of the system 100 of FIG. 1. In particular, the method can be implemented using game server 110. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

At (602) game server 110 receives from an entity a request to distribute virtual objects. The entity can be a real world vendor, business, sponsor, advertiser, or other real world entity which seeks to have virtual objects distributed throughout the virtual world. For example, a soda company can find it desirable to distribute virtual coupons throughout the virtual world of the parallel reality game.

At (604) game server 110 identifies a real world carrier for distribution. At (606) game server 110 modifies game data to generate new virtual objects. At (608) the new virtual objects are associated with the virtual counterpart of the real world carrier. For example, a limited or unlimited number of virtual coupons can be generated and then transferred to or associated with the virtual counterpart of a soda delivery truck.

At (610) game server 110 accesses data associated with the location of the real world carrier. As discussed above, data associated with the location of a real world carrier can take many various forms. In particular, data associated with the location of a real world carrier can include, but is not limited to, positional data determined by a positioning system associated with the real world carrier, schedules or timetables associated with a real world carrier, delivery estimates associated with a real world carrier, or average transportation times and routes associated with a real world carrier. Such data can be accessed from real world carrier database 117 or other internal or external sources.

At (612) game server 110 modifies game data to distribute the virtual objects. The distribution can occur such that the position in the virtual world at which the virtual object is distributed is based at least in part on the data associated with the location of the real world carrier.

In one embodiment, the virtual counterpart of a real world carrier can distribute virtual objects at predetermined intervals along the path of the real world carrier. To illustrate, a soda delivery truck may be travelling along Interstate 85 from Atlanta, Ga. to Charlotte, N.C. The virtual counterpart of a soda delivery truck can distribute a virtual coupon at its current position every 30 minutes. Players can receive the virtual coupon by navigating to the location where a virtual coupon was distributed and picking up, requesting possession, or otherwise obtaining the virtual coupon. The virtual object can be deposited at the precise virtual location at which the virtual counterpart of the delivery truck was located at the time of distribution. Alternatively, the virtual object can be distributed to a location associated with the location of the truck as determined by given parameters. For example, if the delivery truck is approaching exit 48A, then the virtual object could be distributed to the virtual counterpart of the real world vendor who is closest to exit 48A and participating in the parallel reality game.

In other embodiments, a virtual counterpart of a real world carrier can distribute virtual objects based upon distance traveled, presence within designated distribution zones, time of day, weather conditions, or other suitable means of directing distribution. The virtual object can remain stationary at the position of distribution, be distributed to the nearest distribution zone, or be distributed in any other suitable manner. Virtual objects can also be distributed in such a manner that they form a path leading towards a game objective.

In another embodiment, virtual objects can be distributed upon request from an eligible player. For example, a limited or unlimited number of virtual coupons can be linked to the virtual counterpart of a soda delivery truck. As the delivery truck travels from one delivery location to the next, players can request distribution of a virtual coupon from the virtual counterpart of the soda delivery truck. Eligibility requirements can be imposed upon players requesting distribution. Exemplary requirements include requiring that the requesting player be within a determined distance from the real world carrier, that the player interacts with the real world carrier or any associated transportation infrastructure, that the player exchanges a given amount of virtual currency, or other suitable requirements.

In another aspect, the virtual counterpart of a real world carrier can generate a new virtual object. For example, a new virtual object can be generated every few seconds or other suitable time interval and then distributed by the virtual counterpart of a real world carrier as the real world carrier navigates through the real world. Alternatively, a new virtual item can be generated to satisfy a request for distribution by an eligible player.

In yet another embodiment, a real world carrier can distribute virtual objects to selected of a plurality of players in a randomized fashion. For example, a race car can distribute a virtual coupon once per race lap completed to one of a plurality of candidate players in a randomized fashion, such that the player who receives the distribution is randomly selected from all candidate players. The players eligible to participate as candidate players can be selected using a number of selection techniques. For example, all players who have scanned a QR-code present on their race event ticket can be candidate players. Alternatively, for example, players who are seated in the section of the grandstand most proximate to the race car at the time of distribution can be candidates eligible to receive the randomized distribution.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of transporting virtual objects in a virtual world associated with a parallel reality game, the virtual world having a geography that parallels at least a portion of the geography of the real world, the method comprising:

receiving, by one or more computing devices, a first request to transfer a virtual object from a first player of the parallel reality game to a virtual counterpart of a real world carrier;

in response to the first request, transferring, by the one or more computing devices, the virtual object from the first player to the virtual counterpart of the real world carrier;

after transferring the virtual object from the first player to the virtual counterpart of the real world carrier, accessing, by the one or more computing devices, at least one data source storing or providing data associated with the location of the real world carrier, wherein the real world carrier comprises a real world vehicle;

modifying, by the one or more computing devices, game data associated with the parallel reality game to transport the virtual object through the virtual world such that the position of the virtual object in the virtual world is based at least in part on the data associated with the location of the real world carrier and such that the virtual object is transported through the virtual world without requiring corresponding movement through the real world by the first player of the parallel reality game;

after modifying the game date associated with the parallel reality game to transport the virtual object through the virtual world, receiving, by the one or more computing devices, a second request to transfer the virtual object from the virtual counterpart of the real world carrier to a second player of the parallel reality game; and in response to the second request, transferring, by the one or more computing devices, the virtual object from the virtual counterpart of the real world carrier to the second player, whereby the first player can transfer ownership of the virtual object to the second player without requiring the first player and the second player to be in physical proximity.

2. The computer-implemented method of claim 1, wherein the data associated with the location of a real world carrier comprises positional data determined by a positioning system associated with the real world carrier.

3. The computer-implemented method of claim 1, wherein the data associated with the location of a real world carrier comprises an estimated location of the real world carrier determined using a schedule or timetable associated with the real world carrier.

4. The computer-implemented method of claim 1, wherein the data associated with the location of a real world carrier comprises an estimated location of the real world carrier determined using a delivery estimate associated with the real world carrier.

5. The computer-implemented method of claim 1, wherein the data associated with the location of a real world carrier comprises data concerning average transportation times and routes associated with the real world carrier.

6. The computer-implemented method of claim 1, wherein transferring, by the one or more computing devices, the virtual object from the virtual counterpart of the real world carrier to the second player comprises:

modifying, by the one or more computing devices, game data associated with the parallel reality game to transfer the virtual object to the second player.

7. The computer-implemented method of claim 6, further comprising:

determining, by the one or more computing devices, prior to modifying game data associated with the parallel reality game to transfer the virtual object to the second player, eligibility of the second player to receive transfer of the virtual object.

8. The computer-implemented method of claim 7, wherein eligibility of the second player to receive transfer of the virtual object is determined based upon data indicating that the second player is located within a determined distance from the real world carrier.

9. The computer-implemented method of claim 7, wherein eligibility of the second player to receive transfer of the virtual object is determined based upon the status of a virtual lock associated with the virtual object.

10. The computer-implemented method of claim 1, further comprising:

modifying, by the one or more computing devices, game data associated with the parallel reality game to generate the virtual object prior to modifying game data to transport the virtual object.

11. The computer-implemented method of claim 1, wherein modifying, by the one or more computing devices, game data associated with the parallel reality game to transport the virtual object through the virtual world such that the position of the virtual object in the virtual world is based at least in part on the data associated with the location of the real world carrier comprises modifying, by the one or more computing devices, game data associated with the parallel reality game to distribute the virtual object such that the position in the virtual world at which the virtual object is distributed is based at least in part on the data associated with the location of the real world carrier.

12. A non-transitory machine readable medium storing instructions that, when executed by at least one processor of a machine, cause the machine to perform operations comprising:

receiving a first request from a user to effectuate transfer of one or more virtual objects to a virtual counter-part of a real world carrier, the virtual counter-part of the real world carrier existing in a virtual world associated with a parallel reality game, the virtual world having a geography that parallels at least a portion of the geography of the real world;

sending to a host server the first request to transfer the one or more virtual objects to the virtual counter-part of the real world carrier;

receiving from the host server modified game data reflecting a first transfer of the one or more virtual objects to the virtual counter-part of the real world carrier;

presenting a modified user interface reflecting the first transfer of the one or more virtual objects to the virtual counter-part of the real world carrier;

receiving from the host server modified game data reflecting transportation of the one or more virtual objects in the virtual world based on data associated with the location of the real world carrier, wherein the transportation of the one or more virtual objects through the virtual world is based on the location of the real world carrier and not the location of the user;

presenting a modified user interface reflecting the transportation of the one or more virtual objects in the virtual world;

receiving from the host server modified game data reflecting a second transfer of the one or more virtual objects from the virtual counter-part of the real world carrier to a player of the parallel reality game, wherein the second transfer was effectuated in response to a second request from the player of the parallel reality game to effectuate transfer of the one or more virtual objects the virtual counter-part of the real world carrier to the player; and presenting a modified user interface reflecting the second transfer of the one or more virtual objects to the player of the parallel reality game;

whereby the user can transfer ownership of the one or more virtual objects to the player of the parallel reality game without requiring the user and the player to be in physical proximity.

13. The non-transitory machine readable medium of claim 12 wherein the operations further comprise:

sending to the host server data which indicates eligibility to request the first transfer of the one or more virtual objects to the virtual counter-part of the real world carrier.

14. The non-transitory machine readable medium of claim 13, wherein the data which indicates eligibility comprises data indicating that the machine is located with a determined distance from the real world carrier.

15. The non-transitory machine readable medium of claim 13, wherein the data which indicates eligibility comprises data indicating that the user has completed an objective.

16. A computer-based system for implementing a parallel reality game, the computer-based system comprising:

a game server operable to host a parallel reality game, the game server having a memory, a processor, and a network interface, the parallel reality game providing a virtual world having a geography that parallels at least a portion of the geography of the real world;

the game server operable to provide, via a network interface, game data associated with the parallel reality game to a plurality of remote computing devices;

wherein the game server is configured to perform operations, the operations comprising:

receiving a first request to transfer a virtual object from a first player of the parallel reality game to the virtual counterpart of a real world carrier;

in response to the first request, transferring the virtual object from the first player to the virtual counterpart of the real world carrier;

after transferring the virtual object from the first player to the virtual counterpart of the real world carrier, accessing at least one data source storing or providing data associated with the location of the real world carrier;

modifying game data associated with the parallel reality game to transport the virtual object through the virtual world such that the virtual object is transported through the virtual world according to corresponding movement of the real world carrier through the real world and without requiring corresponding movement by the first player of the parallel reality game through the real world;

after modifying the game data to transport the virtual object through the virtual world, receiving a second request to transfer the virtual object from the virtual counterpart of the real world carrier to a second player of the parallel reality game; and in response to the second request, transferring the virtual object from the virtual counterpart of the real world carrier to the second player;

whereby the first player can transfer ownership of the virtual object to the second player without requiring the first player and the second player to be in physical proximity.

17. The computer-based system for implementing a parallel reality game of claim 16, wherein the data associated with the location of a real world carrier comprises positional data determined by a positioning system associated with the real world carrier.

18. The computer-based system for implementing a parallel reality game of claim 16, wherein the game server is further configured to modify game data associated with the parallel reality game to transfer the virtual object to a recipient.

19. The computer-based system for implementing a parallel reality game of claim 16, wherein modifying game data associated with the parallel reality game to transport the virtual object through the virtual world such that the virtual object is transported through the virtual world according to corresponding movement of the real world carrier through the real world and without requiring corresponding movement by the first player of the parallel reality game through the real world comprises modifying game data associated with the parallel reality game to distribute selected of a plurality of virtual objects throughout the virtual world such that the position of each of the plurality of virtual objects is based at least in part on the data associated with the location of the real world carrier.

* * * * *

UNITED STATES PATENT AND TRADEMARK OFFICE
CERTIFICATE OF CORRECTION

PATENT NO. : 8,968,099 B1  
APPLICATION NO. : 13/666045  
DATED : March 3, 2015  
INVENTOR(S) : Hanke et al.

Page 1 of 1

It is certified that error appears in the above-identified patent and that said Letters Patent is hereby corrected as shown below:

Page 2 of the title page, item (56), under U.S. Patent Documents, Column 2, Line 6, Please delete entry "2012/0062953 A1 3/20/12 Silverbrook et al." and add "2012/0052953 A1 3/01/2012 Annambhotla et al.".

In the Claims:

Column 20, Line 65, after word "game" please delete "date" and insert --data--.

Signed and Sealed this  
Eighth Day of March, 2016

Michelle K. Lee  
*Director of the United States Patent and Trademark Office*